United States Patent Office 2,992,241
Patented July 11, 1961

2,992,241
3,17-DIOXYGENATED 6β-HALO-5-METHYL-19-
NOR-5β-ANDROST-9-ENES
Joseph S. Mihina, Skokie, Ill., assignor to G. D. Searle
& Co., Chicago, Ill., a corporation of Delaware
No Drawing. Filed Aug. 23, 1960, Ser. No. 51,253
6 Claims. (Cl. 260—397.3)

This invention relates to 3,17-dioxygenated 6β-halo-5-methyl-19-nor-5β-androst-9-enes and processes for the manufacture thereof. More particularly, this invention relates to chemical compounds of the formula

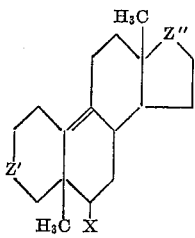

wherein X represents a halogen; and Z' and Z" each represent a hydroxymethylene (>CHOH), alkanoyloxymethylene (>CHOCOR), or carbonyl (>CO) radical, R in the parenthetical formula standing for an alkyl radical. Among the halogens represented by X, especially those having an atomic number less than 53—which is to say fluorine, chlorine, and bromine—are preferred. The hydroxymethylene and alkanoyloxymethylene radicals comprehended by Z' and Z" are desirably in the β configuration, and the latter groupings are best adapted to purposes of this invention when the alkyl constituent (R) is of lower order. Lower alkyl radicals include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ aggregates wherein $n$ is a positive integer amounting to less than 9. Alkanoyloxymethylene radicals of the preferred type are hereinafter referred to as lower alkanoyloxymethylene radicals. Those skilled in the art will recognize that when Z' and Z" in the generic formula designate such groupings, the compounds contemplated are esters of the alcohols depicted when Z' and Z" represent hydroxymethylene radicals.

In addition to the foregoing compounds, 17-alkylated derivatives thereof having the formula

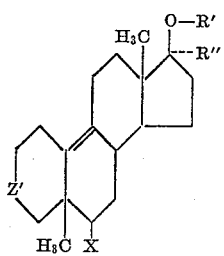

wherein X and Z' have the meanings assigned above; R' represents hydrogen or an alkanoyl radical; and R" represents an ethynyl, vinyl, or ethyl radical, are likewise within the scope of this invention.

The subject compounds are useful because of their valuable pharmacological activity, specifically, their capacity to block the urinary response to desoxycorticosterone acetate without inducing undesirable side-effects.

Manufacture of the compounds hereof proceeds by heating concurrently or seriatim, a 5α-hydroxy-6β-halo steroid of the formula

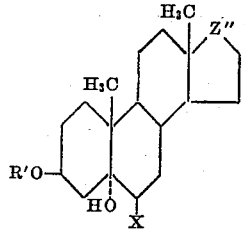

(X, R', and Z" being defined as before) with an alkanoic acid anhydride and potassium acid sulfate or sulfuric acid, a corresponding alkanoic acid being added to increase solubility if desired. The 17-oxo esters which result are saponified on heating with alkali carbonate in aqueous methanol, and the 3-ols thus obtained are oxidized to 3-ones by heating, with chromium trioxide in a heterogeneous medium comprising aqueous acetic acid and an inert solvent for the steroid present. The 3,17-diesters derived from the foregoing 5α-hydroxy-6β-halo steroids are converted to the 3,17-diols on heating with excess alkali carbonate in aqueous methanol; alternatively, when allowed to stand for up to 2 hours at room temperatures with solely one equivalent of an alkali carbonate in aqueous methanol, they afford a mixture of the 3 and 17 monoesters separable by chromatography on silica gel, using benzene and ethyl acetate as developing solvents. From the 3-hydroxy-17-esterified steroids so produced, on oxidation with chromium trioxide as aforesaid, the corresponding 3-ones are obtained; and these, in turn, are saponified by heating with aqueous methanolic alkali carbonate.

As an exception to the foregoing procedures, the 17-ethynyl products of the invention are obtained from the 17-oxo-3-esterified products hereof by heating the latter compounds with ethynylmagnesium bromide in an ethereal solvent medium, followed by acid hydrolysis; and the ethynyl products are consecutively converted to 17-vinyl and 17-ethyl compounds corresponding by hydrogenation catalyzed with palladium supported on calcium carbonate and charcoal, respectively.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations, observed at 26° centigrade, refer to the D line of sodium.

EXAMPLE 1

A. *5,6α-epoxy-17,17-ethylenedioxy-5α-androstan-3β-ol*

To a solution of 190 parts of 17,17-ethylenedioxy-androst-5-en-3β-ol in 650 parts of benzene at temperatures in the range 25–35° is added, during 1½ hours, a solution of 8 parts of sodium acetate in 114 parts of 40% peracetic acid. The resultant mixture is let stand for 3½ hours, then made alkaline with 800 parts of aqueous 10% sodium hydroxide, temperatures again being maintained in the range 25–35° during the latter operation. The aqueous phase is drawn off and discarded; and the remaining phase is washed to neutrality (i.e., washed until the washings are neutral to litmus) with water, dried over anhydrous sodium sulfate, and finally stripped of solvent by vacuum distillation. The residue, recrystallized from aqueous acetone containing just sufficient pyridine to insure alkalinity, affords 5,6α-epoxy-17,17-ethylenedioxy-5α-androstan-3β-ol, melting at 161–163° and further characterized by a specific rotation of −92.6° in 0.984% chloroform solution.

B. 6β-fluoro-3β,5-dihydroxy-5α-androstan-17-one

A mixture of 10 parts of 5,6α-epoxy-17,17-ethylenedioxy-5α-androstan-3β-ol, 83 parts of 48% hydrofluoric acid, and 150 parts of dichloromethane is stirred vigorously for 15 minutes, then mixed with 500 parts of water. The dichloromethane phase is drawn off and washed with water until the washings are neutral to litmus. Solvent is thereupon stripped by vacuum distillation, and the residue is crystallized from ethyl acetate. The 6β-fluoro-3β,5-dihydroxy-5α-androstan-17-one thus obtained melts at 275–280°, with decomposition, and has a specific rotation of +51.2° in 1.018% methanol solution.

C. 3β-acetoxy-6β-fluoro-5-methyl-19-nor-5β-androst-9-en-17-one

A mixture of 19 parts of 6β-fluoro-3β,5-dihydroxy-5α-androstan-17-one and 500 parts of acetic anhydride is heated at 100–110° for 1 hour. It is then cooled to approximately room temperature, whereupon 3 parts of powdered potassium acid sulfate is introduced and heating is resumed at 90–100° with agitation for 15 minutes. The resultant mixture is poured into 4500 parts of 15% brine and let stand therein for 2 hours. The mixture thus obtained, in turn, is extracted with ethyl acetate; and the acetate extract is washed consecutively with water and aqueous 10% sodium bicarbonate, dried over anhydrous sodium sulfate, and stripped of solvent by vacuum distillation. Crystallization of the residue from aqueous 95% ethanol affords 3β-acetoxy-6β-fluoro-5-methyl-19-nor-5β-androst-9-en-17-one, melting at 157–159° and with a specific rotation of +175° in 1% methanol solution. The product has the formula

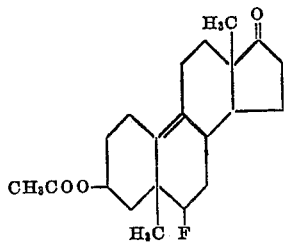

EXAMPLE 2

A. 3β-acetoxy-6β-chloro-5-methyl-19-nor-5β-androst-9-en-17-one

A mixture of 249 parts of 6β-chloro-3β,5-dihydroxy-5α-androstan-17-one (prepared by substituting 445 parts of 37% hydrochloric acid for the 48% hydrofluoric acid called for in Example 1B) and 1300 parts of acetic anhydride is heated at the boiling point under reflux for ½ hour. It is then cooled to 35°, at which temperature 48 parts of powdered potassium acid sulfate is introduced. The resultant mixture is heated with agitation at 55–60° for 20 minutes, whereupon it is poured into 13,000 parts of 15% brine and let stand therein for 2 hours. The mixture thus obtained is extracted with a total of 11,000 parts of isopropyl acetate, and the acetate extract is washed with aqueous 10% sodium bicarbonate and then to neutrality with water. The extract is thereupon dried over anhydrous sodium sulfate and finally concentrated by vacuum distillation to the point of incipient turbidity. The precipitate which separates on standing is 3β-acetoxy-6β-chloro-5-methyl-19-nor-5β-androst-9-en-17-one, which, filtered off and dried in air, melts at approximately 189–190° and has a specific rotation of +230° in 1.011% chloroform solution. The product has the formula

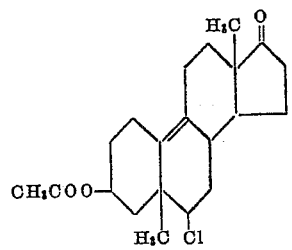

B. 3β-acetoxy-6-chloroandrost-5-en-17-one and 3β-acetoxy-6β-chloroandrost-4-en-17-one The filtrate derived from the isolation of 3β-acetoxy-6β-chloro-5-methyl-19-nor-5β-androst-9-en-17-one in the foregoing Part A of this example is freed of solvent by vacuum distillation, and the dried residue is taken up in benzene. The benzene solution is chromatographed on silica gel, using benzene and ethyl acetate as developing solvents. From eluates comprising 19 parts of benzene for each part of ethyl acetate present there are obtained, on evaporation of solvent, 3β-acetoxy-6-chloroandrost-5-en-17-one, melting at approximately 192–193° and having a specific rotation of −20° in 1.014% chloroform solution, and 3β-acetoxy-6β-chloroandrost-4-en-17-one, melting at 204–206° and with a specific rotation of +63° in 1.011% chloroform solution, the latter product being somewhat more firmly retained on the silica gel than the former. These products have the formulas

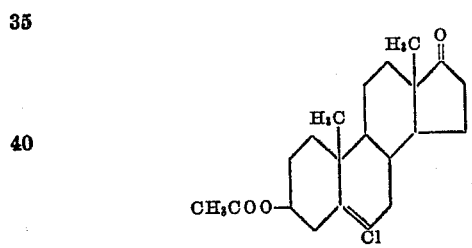

and

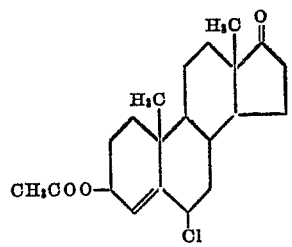

respectively. They are androgenic agents.

EXAMPLE 3

6β-chloro-3β-hydroxy-5-methyl-19-nor-5β-androst-9-en-17-one

A mixture of 44 parts of 3β-acetoxy-6β-chloro-5-methyl-19-nor-5β-androst-9-en-17-one dissolved in 2400 parts of methanol, 120 parts of potassium carbonate, and 1100 parts of water is heated at the boiling point under reflux for 1 hour and then poured into 12,000 parts of 10% brine. After standing for 2 hours, the resultant mixture is filtered; and the solid precipitate thus isolated is washed with water and dried in air. Crystallized from ethyl acetate, it melts at approximately 186–187° and is characterized by a specific rotation of +255° in 1.004% chloroform solution. This material is 6β-chloro- 3β - hydroxy - 5 - methyl - 19 - nor - 5β - androst - 9 - en-17-one, of the formula

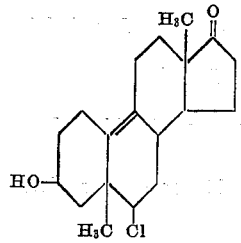

EXAMPLE 4

*6β-chloro-5-methyl-19-nor-5β-androst-9-ene-3,17-dione*

To a solution of 23 parts of 6β-chloro-3β-hydroxy-5-methyl-19-nor-5β-androst-9-en-17-one in 880 parts of benzene is added a solution of 11 parts of chromium trioxide in 75 parts of water and 158 parts of acetic acid. The resultant mixture is maintained with agitation at room temperatures for 4 hours, whereupon a solution of 10 parts of sodium sulfite in 400 parts of water is stirred in. The aqueous phase is separated and extracted with a total of 5000 parts of ethyl acetate, the resultant extract being combined with the benzene phase. The solution thus obtained is washed with aqueous 10% sodium bicarbonate and then to neutrality with water, dried over anhydrous sodium sulfate, and finally stripped of solvent by vacuum distillation. The residue, crystallized from ethyl acetate, affords the desired 6β-chloro-5 - methyl - 19 - nor - 5β - androst - 9 - ene - 3,17 - dione, melting at 179–181° and with a specific rotation of +191° in 0.985% chloroform solution. The product has the formula

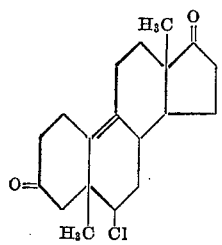

EXAMPLE 5

A. *5,6α-epoxy-5α-androstane-3β,17β-diol*

To a suspension of 50 parts of androst-5-ene-3β,17β-diol in 810 parts of benzene is added 248 parts of 6% peracetic acid. The foregoing reaction mixture is maintained with agitation for 17 hours, then filtered. The solid product thus isolated, dried at room temperatures and recrystallized from ethyl acetate, affords 5,6α-epoxy-5α-androstane-3β,17β-diol monohydrate which, upon drying in vacuo for 2 hours, loses its water of crystallization. Both the monohydrate and the anhydrous material melt at approximately 194–195° and are characterized by a specific rotation of —66.6° in 1.006% ethanol solution.

Partitioning of the reaction mixture filtrate between water and isopropyl acetate, followed in order by separation and washing of the acetate phase with aqueous 10% sodium carbonate and water (to neutrality) yields, upon distillation of solvent, an additional crop of the product monohydrate, which is purified by recrystallization from ethyl acetate and freed of water of crystallization as above.

B. *6β-chloro-5α-androstane-3β,5,17β-triol*

To a slurry of 29 parts of 5,6α-epoxy-5α-androstane-3β,17β-diol in 1340 parts of dichloromethane is added 1190 parts of 37% hydrochloric acid. The resultant mixture is maintained with vigorous agitation for 15 minutes and thereupon partitioned between water and dichloromethane. The dichloromethane phase is separated, dried over anhydrous sodium sulfate, and concentrated nearly to dryness via distillation. The distilland is thereupon filtered, and the crystalline solid thus isolated is recrystallized from dichloromethane to give 6β-chloro-5α-androstane-3β,5,17β-triol, melting at 172–175°. Recrystallization from ethyl acetate affords solvated 6β-chloro-5α-androstane-3β,5,17β-triol containing ½ molecule of ethyl acetate per molecule of steroid and melting at approximately 125–126°. Similarly, recrystallization from acetone affords a solvated 6β-chloro-5α-androstane-3β,5,17β-triol containing 1 molecule of acetone per molecule of steroid and characterized by a specific rotation of —23° in 1% methanol solution.

C. *3β,17β-diacetoxy-6β-chloro-5α-androstan-5-ol*

A mixture of 22 parts of 6β-chloro-5α-androstane-3β,5,17β-triol and 119 parts of acetic anhydride is heated at 120–140° for ½ hour, then cooled to 40° and poured into water. After 2 hours, the resultant mixture is filtered; and the solid product thus isolated is washed with water and dried in air. Recrystallized from acetone, it melts at approximately 197–198° and is further characterized by a specific rotation of —57° in 1% chloroform solution. This material is 3β,17β-diacetoxy-6β-chloro-5α-androstan-5-ol.

D. *3β,17β-diacetoxy-6β-chloro-5-methyl-19-nor-5β-androst-9-ene*

A mixture of 22 parts of 6β-chloro-5α-androstane-3β,5,17β-triol and 119 parts of acetic anhydride is heated at 120–140° for ½ hour and then cooled to 40°, whereupon 4 parts of powdered potassium acid sulfate is introduced. The resulting mixture is heated with agitation at 55–65° for ½ hour and then poured into 1500 parts parts of 10% brine. After 2 hours, the mixture thus obtained is extracted with isopropyl acetate. The acetate extract is washed with aqueous 10% sodium bicarbonate and then to neutrality with water. The extract is then dried over anhydrous sodium sulfate and stripped of solvent by vacuum distillation. The residue, recrystallized from ethyl acetate, melts at approximately 143–144° and has a specific rotation of +73° in 0.518% chloroform solution. This material is 3β,17β-diacetoxy-6β-chloro-5-methyl-19-nor-5β-androst-9-ene, of the formula

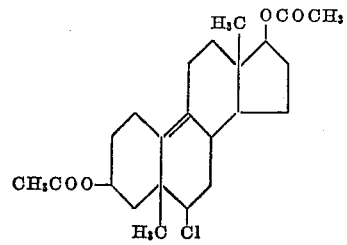

What is claimed is:
1. A compound of the formula

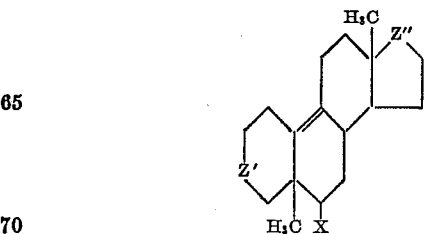

wherein Z' and Z" each represent a member of the class consisting of β-hydroxymethylene, β-(lower alkanoyloxy)-methylene, and carbonyl radicals; and X represents halogen of atomic number less than 18.

2. A compound of the formula
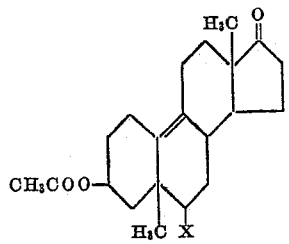
wherein X represents halogen of atomic number less than 18.
3. 3β-acetoxy-6β-chloro-5-methyl-19-nor-5β-androst-9-en-17-one.
4. 6β-chloro-3β-hydroxy-5-methyl-19-nor-5β-androst-9-en-17-one.
5. 6β - chloro - 5-methyl-19-nor-5β-androst-9-ene-3,17-dione.
6. 3β,17β - diacetoxy-6β-chloro-5-methyl-19-nor-5β-androst-9-ene.
No references cited